United States Patent [19]

Rinaldo

[11] Patent Number: 5,588,503
[45] Date of Patent: Dec. 31, 1996

[54] FLOW CONTROLLER

[75] Inventor: John M. Rinaldo, E. Greenbush, N.Y.

[73] Assignee: Atlas Copco Aktiebolag, Sweden

[21] Appl. No.: 517,505

[22] Filed: Aug. 21, 1995

[51] Int. Cl.⁶ ........................................... F01M 1/18
[52] U.S. Cl. .................. 184/6.4; 184/6; 137/112
[58] Field of Search ................... 184/6.1, 6.4, 6, 184/7.4; 417/291; 137/111, 112, 119.01, 512.5

[56] References Cited

U.S. PATENT DOCUMENTS

2,761,463  9/1956  Wagner ................................ 137/112
3,877,545  4/1975  Orr ........................................ 184/6.3
4,231,716  11/1980  Kubota et al. ......................... 417/315
5,199,528  4/1993  Rinaldo ................................. 184/6.4

Primary Examiner—Thomas E. Denion
Attorney, Agent, or Firm—Harris Beach & Wilcox, LLP

[57] ABSTRACT

A flow controller for preventing damage to a rotating machine by automatically redirecting the flow of lubricating oil in and out of a shaft driven pump in the event the machine goes into reverse rotation. The controller contains sealing elements that are moved under the influence of oil moving through the flow controller.

18 Claims, 6 Drawing Sheets

FLOW CONTROLLER

BACKGROUND OF THE INVENTION

This invention relates to an apparatus for protecting a rotating machine such as an electric motor, internal combustion engine or other drive means and/or driven equipment such as centrifugal compressors, fans, pumps, conveyors, and the like, in the event such a machine goes into reverse rotation and, in particular to an apparatus connected to the oil pump that will automatically supply lubrication to the machine's lubricated components with the oil pump rotating in either normal or reverse direction.

Machines such as centrifugal compressors are able to operate as turbines which, unfortunately, is typically what occurs when there is a check valve failure. Conventionally, the oil pump is coupled directly to the compressor drive motor and will attempt to pull oil out of the compressor bearings and other lubricated components when the machine experiences a reversal in rotation. This, of course, can lead to damage to the bearings and other machine parts.

One prior method of providing reverse rotation protection is to provide an independently driven auxiliary pump which takes over the lubrication load if the primary pump fails or the machine is turning backwards, but unfortunately reverse rotation often occurs when there is a power failure that renders such auxiliary pumps inoperative.

Another prior method of providing reverse rotation protection is to provide a by-pass system utilizing four check valves to insure that oil is delivered to the machine from the primary pump regardless of the direction of rotation of the machine shaft. Such a system has numerous components and connections which both increase the likelihood of leaks and increases the cost of the system. Further, the swing type check valves often used normally oscillate slightly during service, sometimes leading to wear and eventual failure of the pivot and therefore the valve.

U.S. Pat. No. 5,199,528, describes a flow controller for protecting a rotating machine that works quite well in practice. However, it has been found that under certain conditions it is possible for contamination in the oil to find its way between the valve shuttle and the controller housing, which might hinder the operation of the device. Additionally, the thermal expansion of different coacting material parts or transient temperature conditions may, on occasion create adverse operating conditions. These problems can be alleviated by increasing the gap between the shuttle and the housing, but this may lead to unwanted oil leakage decreasing the amount of oil available for lubrication. The prior art device relies on free floating balls to selectively open and close ports in response to the direction of oil flow. Significant flow is required to lift the balls into their seats.

Protective devices in the prior art have provided a margin of safety, but the protective equipment itself can fail thereby endangering the machine.

SUMMARY OF THE INVENTION

It is therefore an object of the present invention to safeguard rotary machines.

It is a further object of the present invention to improve devices for automatically delivering lubricant to a rotating machine when the machine is running in reverse rotation.

Another object of the present invention is to improve devices for priming the primary pump of a rotating machine from an auxiliary pump.

Yet another object of the present invention is to provide a simple and inexpensive device that can be easily attached to a lubricating oil pump which will automatically protect a rotating machine from oil starvation when the machine experiences a reversal in normal operation.

These and other objects of the present invention are attained by means of an automatically operated flow controller for delivering lubricating oil to a rotating machine having a primary pump coupled to the drive unit of the machine. The flow controller further includes a housing having a passage connected to a supply reservoir for providing lubricating oil to the machine, and a second passage is connected to a system for lubricating the machine bearings and other components. The ends of the two passages are connected with channels, and there are further channels connecting the passage ends to the primary pump inlet and outlet. Each passage contains a flow director which responds to the pressure exerted by the oil moving in the system to selectively connect the reservoir and the rotating machine lubricating system to the pump in such a way as to insure that an adequate supply of oil is delivered to the machine when it is running in either a normal or reverse mode of operation. The flow controller is also capable of operating in conjunction with an auxiliary pump to provide priming oil to the primary pump during periods when the machine is not rotating.

BRIEF DESCRIPTION OF THE DRAWINGS

For a better understanding of these and other objects of the present invention, reference shall be made to the following detailed description of the invention which is to be read in association with the accompanying drawings, wherein.

DESCRIPTION OF THE INVENTION

Figure 1:
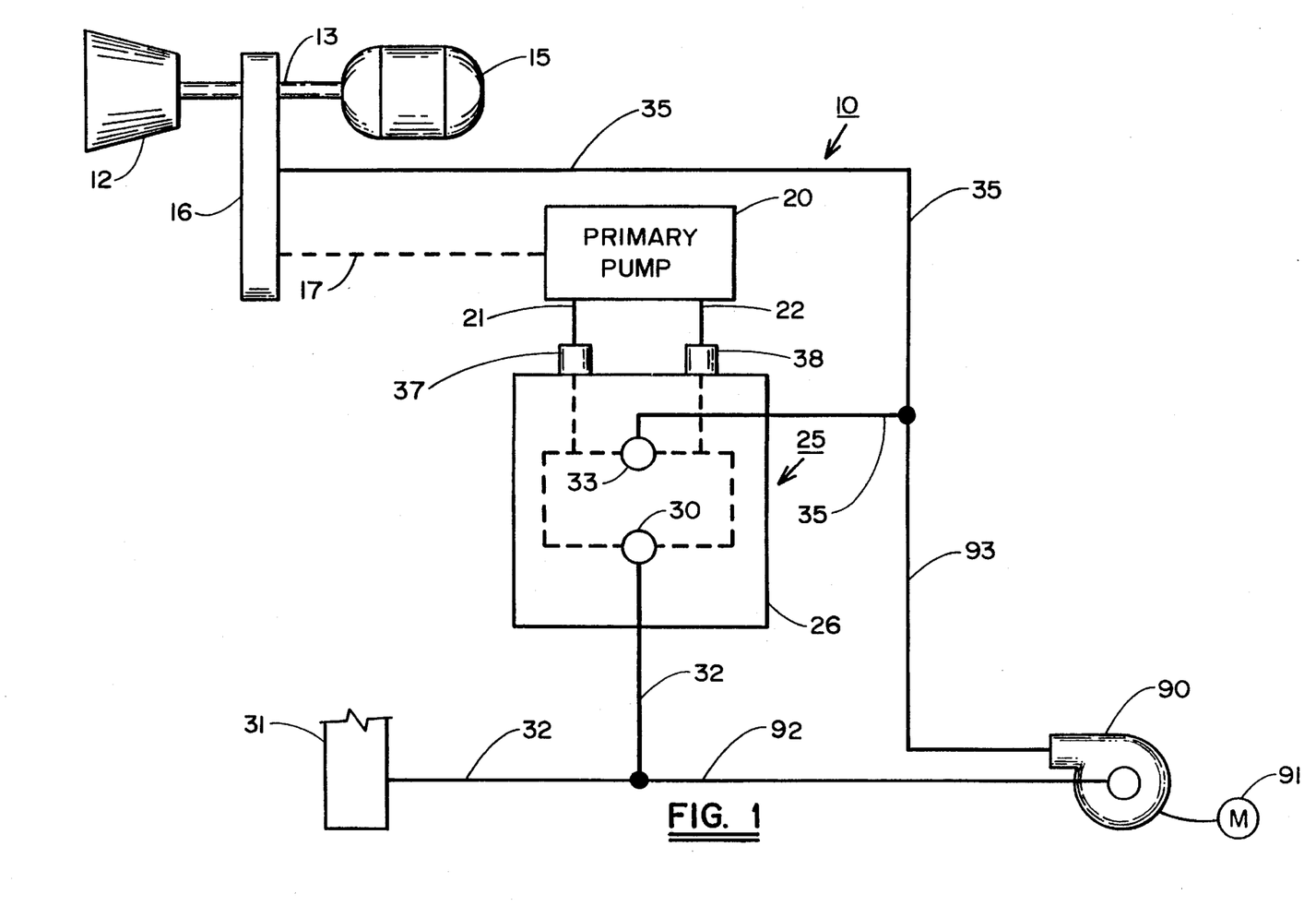
FIG. 1 is a schematic representation of a system for lubricating a centrifugal compressor utilizing the flow controller of the present invention.

Referring initially to FIG. 1 there is shown a schematic diagram of a system generally referenced 10, for providing lubricating oil to a centrifugal compressor 12. As noted above, when such a compressor experiences a check valve failure, the machine may rotate in a reverse direction, that is, a direction that is counter in regard to its normal direction of rotation. As is conventional in the art, the shaft 13 of motor 15 is coupled to gearbox 16, which in turn is connected to compressor 12. The motor is also coupled by any suitable means, either directly or through the gearbox, to a drive connection 17 which, in turn, drives a primary pump 20. The primary pump delivers oil under pressure to pump discharge line 21 when the compressor is operating normally.

The suction side of the primary pump is connected to a suction line 22. Typically, the suction line of the pump is attached to an oil reservoir and the discharge line is arranged to deliver oil to the machine's bearings and other lubricated components. In the event the machine rotates in a reverse direction, the pump operation will also be reversed and it will act to pull oil out of the machine bearings. This will, of course, produce bearing damage or destruction and pose considerable risk to the machine.

A complete oil system typically also contains other components such as an inlet strainer, oil filter, pressure relief valve, pressure and temperature regulators and switches and gages. These items are omitted here for clarity of understanding the flow control device. However, as is well known to those skilled in the art, flow controllers are often used in conjunction with such additional devices.

In order to avoid damage to the machine in the event of a reversal in shaft rotation, the system is provided with an automatically actuated flow controller 25 that will reverse the pump function when the flow through the pump reverses. The flow controller housing 26 has an inlet port 30 which is operatively coupled to an oil reservoir 31 by means of supply line 32. The outlet port 33 is similarly connected to the bearing oil feed lines of the gearbox 16 by means of line 35. Ports 30 and 33 are an integral part of the housing, and may be threaded, flanged, or provided with any other suitable connections for attaching flow lines to the housing. Inlet connector 37 is attached to the discharge line 21 of the pump 20 and an outlet connector 38 attached to the suction line 22 of the pump. The connection between the housing 26 and pump 20 may be accomplished either by directly bolting the two parts together with some suitable sealing means (such as O-rings), or by using pipe or tubing.

Figure 2:
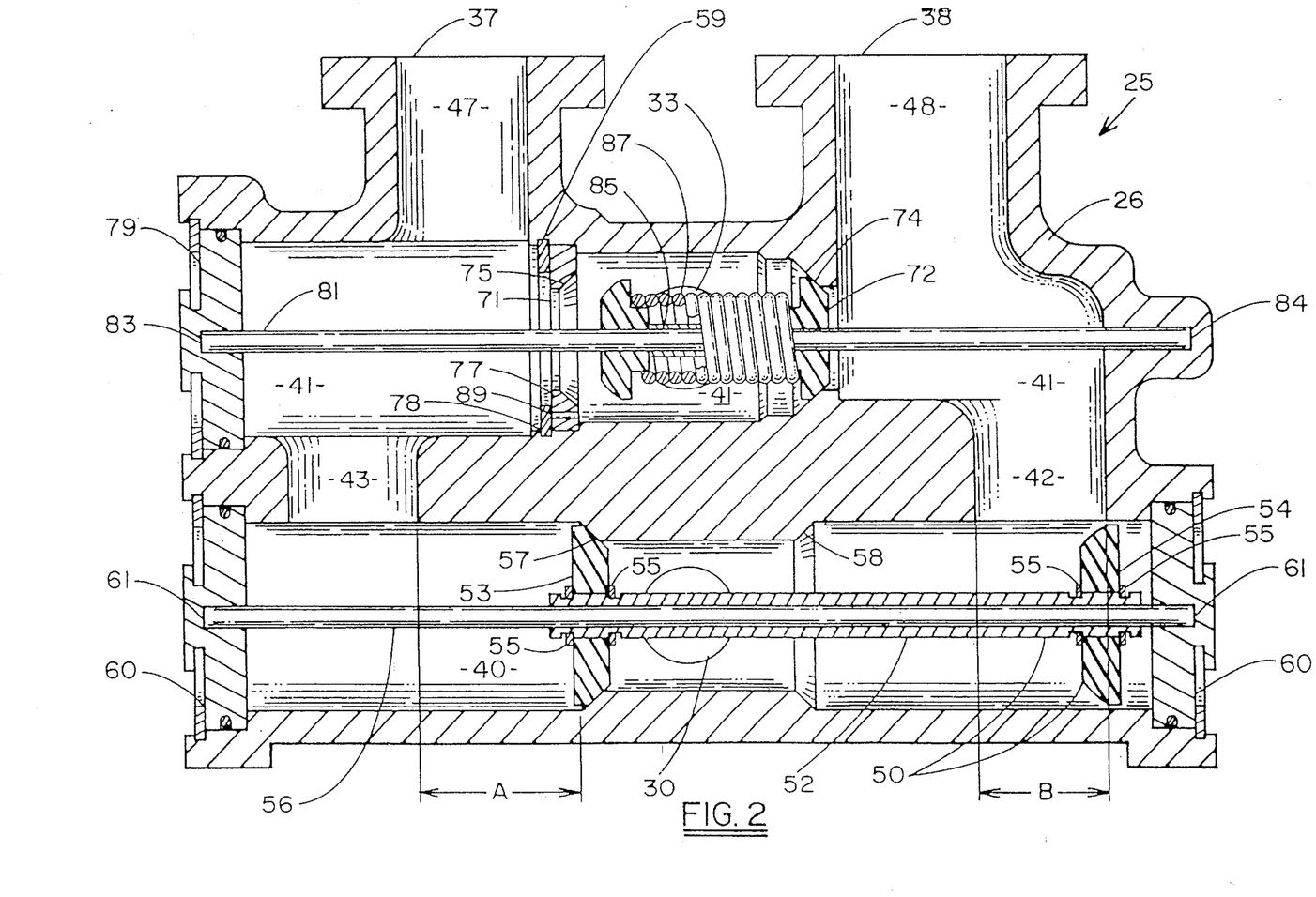
FIG. 2 is a plane view in section of the controller showing the positioning of the flow directors during normal operation of the compressor.

Turning now to FIG. 2, there is shown a sectional view of housing 26 showing the positioning of the flow control components when the compressor is operating in a normal mode. Inlet port 30 is arranged to open into shuttle passage 40 formed in the housing while outlet port 33 is arranged to open into discharge passage 41. Shuttle passage 40 and discharge passage 41 are joined at their opposing ends to connecting channels 42 and 43. The inlet connection 37 communicates with an inlet channel 47 while outlet connection 38 communicates with an outlet channel 48. As will be explained in greater detail below, inlet port 30 and outlet port 33 can be selectively placed in communication with either the outlet connection 38 or the inlet connection 37 to control the flow of oil through the housing.

A double ended shuttle 50 is movably contained within shuttle passage 40. The shuttle consists of a central shaft 52 sealing elements 53 and 54, and retaining rings 55. The sealing elements are held on the ends of the central shaft by the retaining rings. The central shaft is supported by and slides freely upon rod 56. Circular sealing seats 57 and 58 are provided in passage 40 between sealing elements 53 and 54. The axial movement of the shuttle within the passage is limited by these seats. Each end of the shuttle passage is closed by a plug 60 which can be removed to provide access to the passage and the shuttle. The plugs can be secured in place by any suitable means, such as threads or retaining rings. The plugs are adapted to support rod 56 within aligned blind holes 61 to provide a loose sliding fit therein. In the preferred embodiment of this invention the surface of the sealing seats 57 and 58 is conical and the sealing surface of elements 53 and 54 is spherical. As can be seen, this arrangement of parts allows for ease of assembly and permits the seal elements to center themselves in the seats.

A pair of disks 71 and 72 are situated within the discharge passage 41. The disks are permitted to move axially within the passage between a first seat 74 formed in the housing and a second seat 75. Seat 75 is formed in an annular shaped bushing 77 which is held in place by retaining ring 78. Access to the discharge passage is furnished by plug 79, which may be identical to plugs 60, as noted above. A rod 81 guides disks 71 and 72. Rod 81 is in turn supported in holes 83 and 84, in a manner similar to the way rod 56 is supported. Disk spacer 85 rides on rod 81, and prevents the two discharge disks from coming together on either side of the outlet port 33. A spring 87 is also situated between the disks to create a biasing force against the disks to hold them against their associated seats. The spring will hold the disks closed until such time as a differential pressure is established over the disks whereupon one of the disks will move to an open position while the other disk remains closed, thereby permitting oil to flow between one of the channels and the discharge port 33. Bushing 77 has an axial hole 89 outside of seat 75 to permit a metered amount of oil to leak past the seat when discharge disk 71 is seated in seat 75. The purpose for this controlled leakage will be disclosed in further detail below.

Both the shuttle 50 and the discharge disks 71 and 72 are permitted to move axially in their respective passages in response to the oil pressure exerted thereon. When the compressor is running under normal operating conditions, the shuttle and discharge disks are forced into the positions shown in FIG. 2. The oil is drawn into the housing through inlet port 30 and is passed on to the suction side of the primary pump via connecting channel 42 and outlet channel 48. High pressure oil exhausted from the pump is then routed to the inlet channel 47 and connecting channel 43. The oil forces the shuttle into the position shown in FIG. 2 thereby isolating port 30 from the high pressure oil. The oil pressure also forces disk 72 tightly into seat 74, thus isolating port 33 from channel 42 and channel 48. As explained in more detail below, the oil flows from inlet channel 47 past discharge disk 71 to leave the housing through outlet port 33. The flow controller will remain in this configuration as long as the primary pump is turning in a normal direction.

The flow of oil past disk 71 creates a differential pressure that forces the disk 71 towards disk 72. This movement is restricted by disk separator 85 and spring 87. To minimize pressure drop, the spring should be just strong enough to push the discharge disks against their seats when there is no oil flow. If the spring is used without the disk separator, the disk may oscillate slightly during operation which may lead to wear and eventual failure. If the separator is used alone without the spring, there is a possibility that one or both of the disks might assume an unseated position at some point midway between the seats when the pump is operating at a low speed. As can be seen, under these conditions, oil leaving the pump could flow from channel 47 directly through discharge passage 41 into opposing channel 48 thus short circuiting the pump. Accordingly, no oil would be delivered to the gear box.

Figure 3:
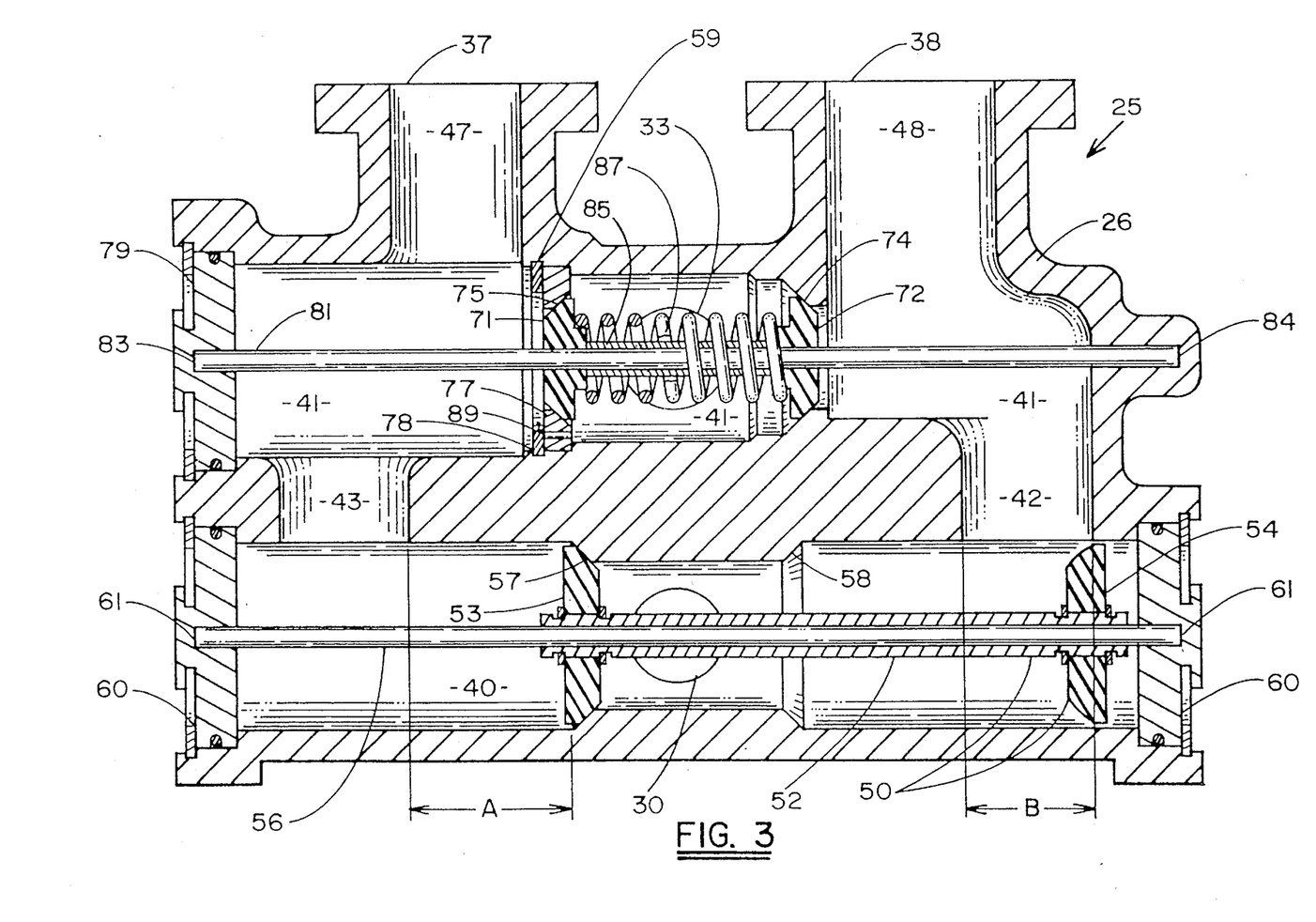
FIG. 3 is again a plane view in section of the controller showing the positioning of the flow directors when the primary pump is shut down and the auxiliary pump is operating.
Figure 4:
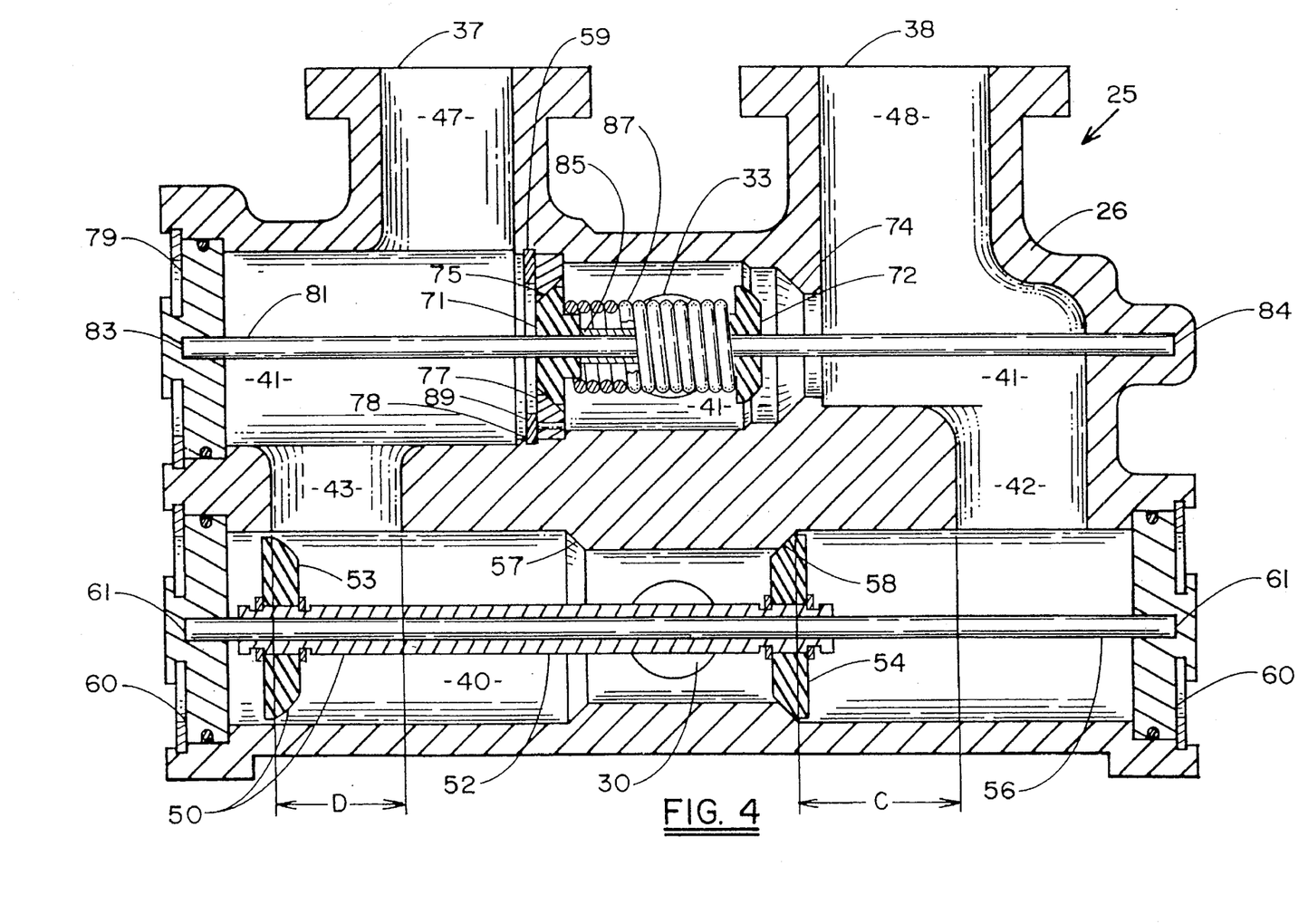
FIG. 4 is a view similar to FIG. 2 showing the positioning of the flow directors during reverse rotation of the compressor.

When the primary pump stops, spring 87 will force discharge disks 71 and 72 against their seats as shown in FIG. 3. Returning to FIG. 1, the oil supply system 10 may be furnished with an auxiliary pump 90 that is driven by an independent motor 91. The suction side of the auxiliary oil pump is connected directly to the oil reservoir supply line 32 via line 92. The discharge side of the pump is connected into oil line 35 by auxiliary supply line 93. In the event the compressor is not running, the auxiliary pump can be brought online either manually or automatically. At this time, the auxiliary oil pump sends high pressure oil directly to the compressor gearbox. High pressure oil is also delivered into the flow controller housing through port 33. As illustrated in FIG. 3, this will force discharge disks 71 and 72 against their seats. Thus, the primary pump will be isolated from the auxiliary pump. However, as noted above, some of the oil delivered into passage 41 via port 33 is allowed to leak into inlet channel 47 through hole 89 (FIGS. 2–4). This oil will flow back into the primary pump through pump discharge line 21 to prime the primary pump. As a result, the primary pump can be brought quickly on-line when the compressor is started.

In the event the machine experiences a failure and begins turning in a reverse direction, the primary pump will also be turning backwards and will take oil from line 21 and deliver it to line 22. This, in turn, will push the shuttle and disks into the position shown in FIG. 4. The first port 30 is now isolated from channel 42 allowing oil from the reservoir to be delivered to the pump via channel 43, channel 47 and line 21. At the same time, disk 72 will be forced away from its seat 74, thus allowing the oil leaving the pump via line 22 to pass through channel 48, passage 41, seat 74, outlet port 33, and line 35 to the machine bearings and other components needing lubrication.

When the shuttle is moving between the positions shown in FIG. 2 and FIG. 4, if there is excessive leakage of oil (in relation to the pump output) between channels 42 and 43, the shuttle may stop moving. The pump output may be quite low at the time the shuttle needs to move, due to the machine operating a low speed. If the shuttle stops in an intermediate position and allows all the oil delivered by the pump to flow past the shuttle back to the pump inlet, then there will be no oil delivered to the machine. Excessive leakage can occur due to either the shuttle disks 53 and 54 having excessive clearance to the walls of passage 40, or due to the distance between the shuttle disks being larger than the distance between the inside edges of channels 42 and 43. Therefore, to minimize the recirculation of oil from the pump discharge to the pump inlet during movement of the shuttle, the clearance between the walls of passage 40 and the shuttle disks 53 and 54 should be kept as small as practical and dimension "A" should be equal to or greater than dimension "B" shown in FIG. 2, and dimension "C" should be equal to or greater than dimension "D" shown in FIG. 4.

Figure 5:
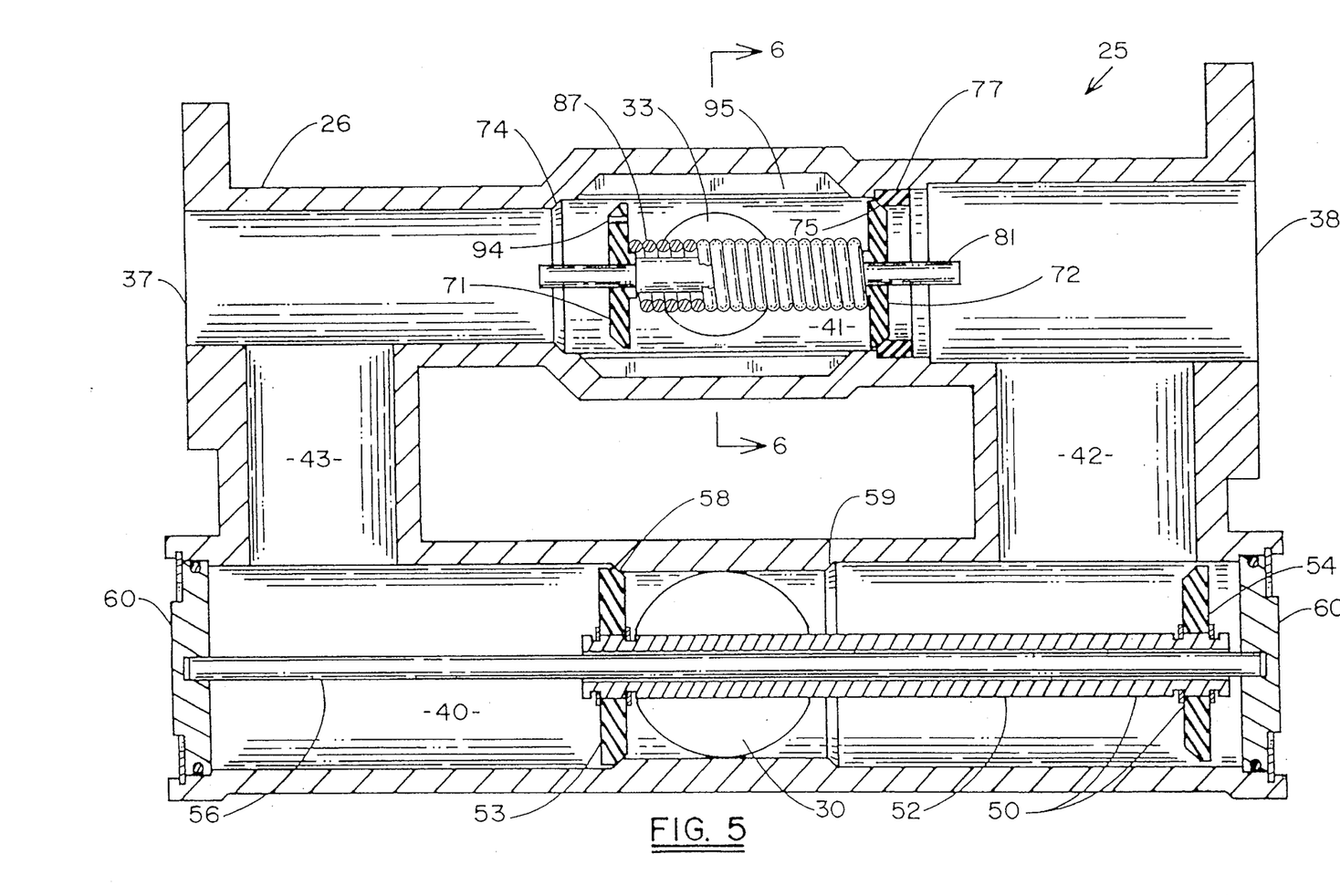
FIG. 5 is a plane view in section of the flow controller showing another embodiment of the invention that may be simply cast and requires minimal machining.
Figure 6:
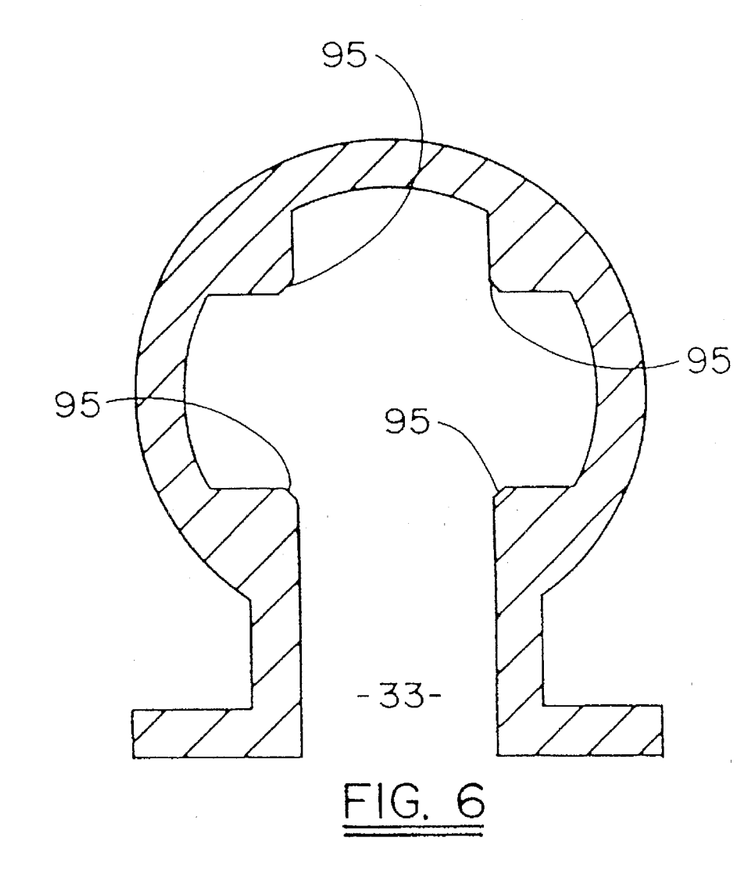
FIG. 6 is an enlarged section taken along lines 6—6 in FIG. 5.
Figure 7:
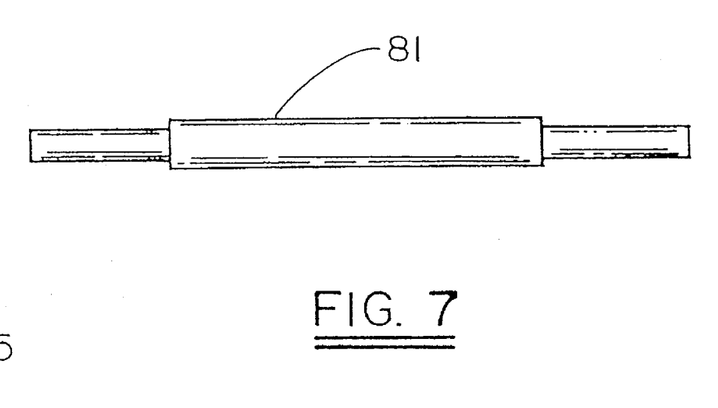
FIG. 7 is a view of the support rod shown in FIG. 5
Figure 8:
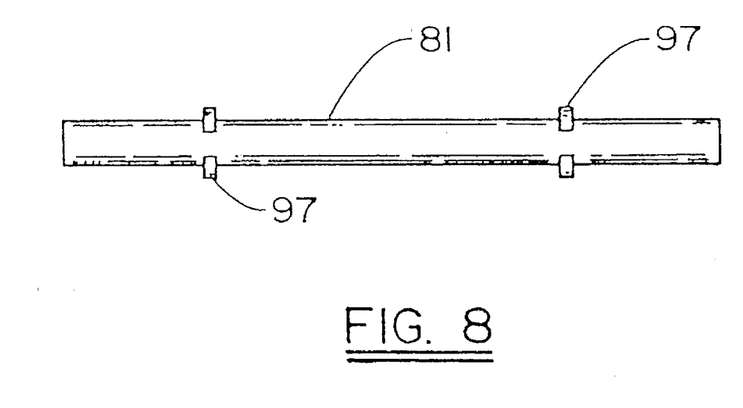
FIG. 8 is a view of an alternate support rod.

Turning now to FIG. 5, there is shown a second embodiment of the present invention in which the pump connections 37 and 38 are at the ends of passage 41. In this embodiment, there is no separate inlet channel 47 or discharge channel 48. Discharge disks 71 and 72 are held aligned by free floating guide rod 81, and are supported on the ribs 95 shown in FIG. 6. Floating guide rod 81 may be fabricated with an enlarged center section as shown in FIG. 7, or may have retaining rings or clips 97 as shown in FIG. 8. The enlarged center section (or retaining rings) serve the function of spacer 85 shown in FIGS. 2 through 4. The enlarged center section or retaining rings also serve to prevent the guide rod from sliding through the discharge disks into either the pump inlet or outlet connections.

As noted above, to prime the primary pump some of the oil delivered into passage 41 via port 33 is allowed to leak into inlet passage 43 through hole 94 (FIG. 5) in discharge disk 71.

While this invention has been described with specific detail to the disclosure above, it is not necessarily limited to that description. Rather, the invention is considered to include any modifications and variations that would present themselves to those skilled in the art without departing from the scope and spirit of this invention, as defined in the following claims.

What is claimed is:

1. A flow control apparatus for protecting a rotating machine that is coupled to a primary pump from experiencing lubrication starvation in the event the machine and pump go into reverse rotation, the apparatus including:

a housing having an inlet channel connected to the discharge side of the primary pump and an outlet channel being spaced apart from said inlet channel, said outlet channel being connected to the suction side of the primary pump, said housing further including a first shuttle passage connecting said spaced apart channels and a second discharge passage spaced apart from said shuttle passage also connecting said spaced apart channels, a first flow means for connecting said shuttle passage with an oil reservoir, a second flow means for connecting said discharge passage to the rotating machine for providing lubricating oil to said machine, a shuttle having axially spaced sealing elements, said shuttle being slidably mounted upon a first slide rod that is centrally positioned in said shuttle passage, said shuttle being arranged to slide along said first slide rod in response to pressure being exerted thereon by oil flowing through said housing to selectively place said first flow means in fluid flow communication with one of said channels, and a pair of free floating sealing disks that are slidably mounted upon a second slide rod that is centrally mounted in said discharge passage, said disks being arranged to slide along said second slide rod in response to pressure being exerted thereon by oil flowing through said housing to selectively place said second flow means in fluid flow communication with one of said channels.

2. The apparatus of claim 1 that further includes a spacer that is slidably mounted upon said second slide rod between said disks.

3. The apparatus of claim 1 that further includes a spring encircling said second slide rod between said sealing disks.

4. The apparatus of claim 1 that further includes a spacer that is slidably mounted upon said second slide rod between said disks and a spring encircling the said spacer for applying a biasing force upon said disks for urging the disks apart.

5. The apparatus of claim 1 that further includes a pair of spaced apart sealing element seats contained within said shuttle passage that cooperates with said sealing elements to close one end of said passage and open the opposite end of said shuttle passage in response to the flow of oil through said housing.

6. The apparatus of claim 5 wherein said sealing element seats are arranged to limit the amount of travel afforded said shuttle along said first slide rod.

7. The apparatus of claim 1 wherein each disk is arranged to close against one of a pair of spaced apart seats mounted in said discharge passage at opposing sides of the discharge port connection.

8. The apparatus of claim 1 that further includes an auxiliary pump having a suction side that is connected to said first flow means and a discharge side connected to said second flow means, said auxiliary pump being operable when the primary pump is inoperative to provide oil to said machine whereupon the sealing disks are forced apart to close both ends of the discharge passage.

9. The apparatus of claim 8 wherein there is a bleed hole that permits a metered amount of oil to move past the sealing disk from the discharge passage into the inlet channel to prime the primary pump when the auxiliary pump is inoperative.

10. The apparatus of claim 1 wherein said slide rods are each mounted in at least one removable plug for providing access to the inside of said housing.

11. A flow control apparatus for protecting a rotating machine that is coupled to a primary pump from experiencing lubrication starvation in the event the machine and pump go into reverse rotation, the apparatus including:

a housing having an inlet channel connected to the discharge side of the primary pump and an outlet channel being spaced apart from said inlet channel, said outlet channel being connected to the suction side of the primary pump, said housing further including a first shuttle passage connecting said spaced apart channels and a second discharge passage spaced apart from said shuttle passage also connecting said spaced apart channels, a first flow means for connecting said shuttle passage with an oil reservoir, a second flow means for connecting said discharge passage to the rotating machine for providing lubricating oil to said machine, a shuttle having axially spaced sealing elements, said shuttle being slidably mounted upon a first slide rod that is centrally positioned in said shuttle passage, said shuttle being arranged to slide along said first slide rod in response to pressure being exerted thereon by oil flowing through said housing to selectively place said first flow means in fluid flow communication with one of said channels, and a pair of free floating sealing disks slidably mounted within said discharge passage upon longitudinally extended ribs formed in the interior wall of said passage, said disks being arranged to move axially in response to pressure exerted upon said disks by oil flowing through said housing to selectively place said second flow means in fluid flow communication with one of said channels.

12. The apparatus of claim 11 wherein each disk is arranged to close against one of a pair of spaced apart seats mounted in said discharge passage at opposing sides of the discharge port connection.

13. The apparatus of claim 12 that further includes a spacer mounted between said disks.

14. The apparatus of claim 12 wherein said disks are slidably mounted upon a common free floating shaft.

15. The apparatus of claim 14 wherein said free floating shaft has an integral spacer means between said disks.

16. The apparatus of claim 14 wherein said free floating shaft has a pair of retaining rings or clips mounted in spaced apart alignment upon said shaft to serve as a spacer means between said disks.

17. The apparatus of claim 11 that further includes an auxiliary pump having a suction side that is connected to said first flow means and a discharge side that is connected to said second flow means, said auxiliary pump being operable when the primary pump is inoperative to provide oil to said machine whereupon the sealing disks are forced apart to close both ends of the discharge passage.

18. The apparatus of claim 17 wherein there is a bleed hole through which a metered amount of oil moves past the sealing disk from the discharge passage into the inlet channel to prime the primary pump when the auxiliary pump is inoperative.

* * * * *